United States Patent
Hamilton et al.

(10) Patent No.: US 8,832,262 B2
(45) Date of Patent: Sep. 9, 2014

(54) NORMALIZING NETWORK PERFORMANCE INDEXES

(75) Inventors: William Eugene Gunnther Hamilton, Placerville, CA (US); Brandon Todd Virgin, Livermore, CA (US); Jiabin Zhao, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 451 days.

(21) Appl. No.: 13/326,520

(22) Filed: Dec. 15, 2011

(65) Prior Publication Data

US 2013/0159496 A1 Jun. 20, 2013

(51) Int. Cl.
*G06F 15/173* (2006.01)

(52) U.S. Cl.
USPC ......................................................... 709/224

(58) Field of Classification Search
CPC ..... H04L 43/04; H04L 43/08; H04L 43/0876; H04L 41/046; H04L 41/50; H04L 41/5032; H04L 43/16; H04L 41/22; H04L 41/5009; H04L 43/022; H04L 43/045; H04L 43/0882; G06F 11/3409
USPC ......................................................... 709/224
See application file for complete search history.

(56) References Cited

U.S. PATENT DOCUMENTS

| | | | |
|---|---|---|---|
| 7,616,583 B1 * | 11/2009 | Power et al. | 370/252 |
| 8,255,516 B1 * | 8/2012 | Zhang et al. | 709/224 |
| 2005/0123003 A1 | 6/2005 | Bordonaro et al. | |
| 2007/0185990 A1 * | 8/2007 | Ono et al. | 709/224 |
| 2007/0198680 A1 | 8/2007 | Krishnaswamy | |
| 2009/0116497 A1 | 5/2009 | Varma et al. | |
| 2010/0100778 A1 * | 4/2010 | Sullivan | 714/57 |
| 2011/0063988 A1 | 3/2011 | Lee et al. | |
| 2012/0005534 A1 * | 1/2012 | Li et al. | 714/26 |

FOREIGN PATENT DOCUMENTS

WO   WO 2008115988 A1 *  9/2008

* cited by examiner

*Primary Examiner* — John Macilwinen
*Assistant Examiner* — Imran Moorad
(74) *Attorney, Agent, or Firm* — Edell, Shapiro & Finnan, LLC

(57) ABSTRACT

Normalization of a network performance index is achieved. Data is stored that groups devices in a network into groups or families according to their estimated life cycles. Data is stored representing a group-specific time window based on the estimated life cycle for devices in that group. Data is stored representing a count of the number of devices in the network within each group during a given unit of time, dynamic sliding windows over successive units of time. A sliding window group count is generated that represents the number of devices within each group in the network as of a current unit of time and prior units of time within the group-specific time window. A total group count is generated by adding the dynamic sliding window group counts for each of the groups. A normalized network performance index is generated by dividing a network performance index by the total group count.

20 Claims, 9 Drawing Sheets

NORMALIZING NETWORK PERFORMANCE INDEXES

TECHNICAL FIELD

The present disclosure relates to network management.

BACKGROUND

Network services and operations today often need to measure network disruption, complexity, risk, and security. Many network performance indexes are defined to meet certain requirements. Usually, the indexes are dependent on the size of the network. Examples of network performance indexes are Cisco System Inc.'s Network Disruption Index (NDI) and Number of Service Requests (NSR). There are numerous others network performance indexes. These indexes are indications of how the network is performing, and if the network operation is improving or declining. However, customers often ask how their networks perform compared to peers/competitors or some industry standard or benchmark. Having an accurate view of the benchmark of an index is important to enable a customer to understand the performance status of the network.

The ability to accurately know the performance of the network can help the customers of network equipment maximize the usage of network resources and decide future investment strategies for the network. However, most network performance indexes are dependent on the size of a network.

DESCRIPTION OF EXAMPLE EMBODIMENTS

Overview

Techniques are provided for normalization of a network performance index. Data is stored that groups devices in a network into groups or families according to their estimated life cycles. Data is stored representing a time window specific to each group based on the respective estimated life cycle for devices in that group. Data is stored representing a count of the number of devices in the network within each group during a given unit of time, over successive units of time. A sliding window group count is generated that represents the number of devices within each group in the network as of a current unit of time and prior units of time within the time window specific to each group based on the stored data representing the count of the number devices within each group during successive units of time. A total group count is generated by adding the sliding window group counts for each of the groups. A normalized network performance index is generated by dividing a network performance index by the total group count.

Example Embodiments

Figure 1:
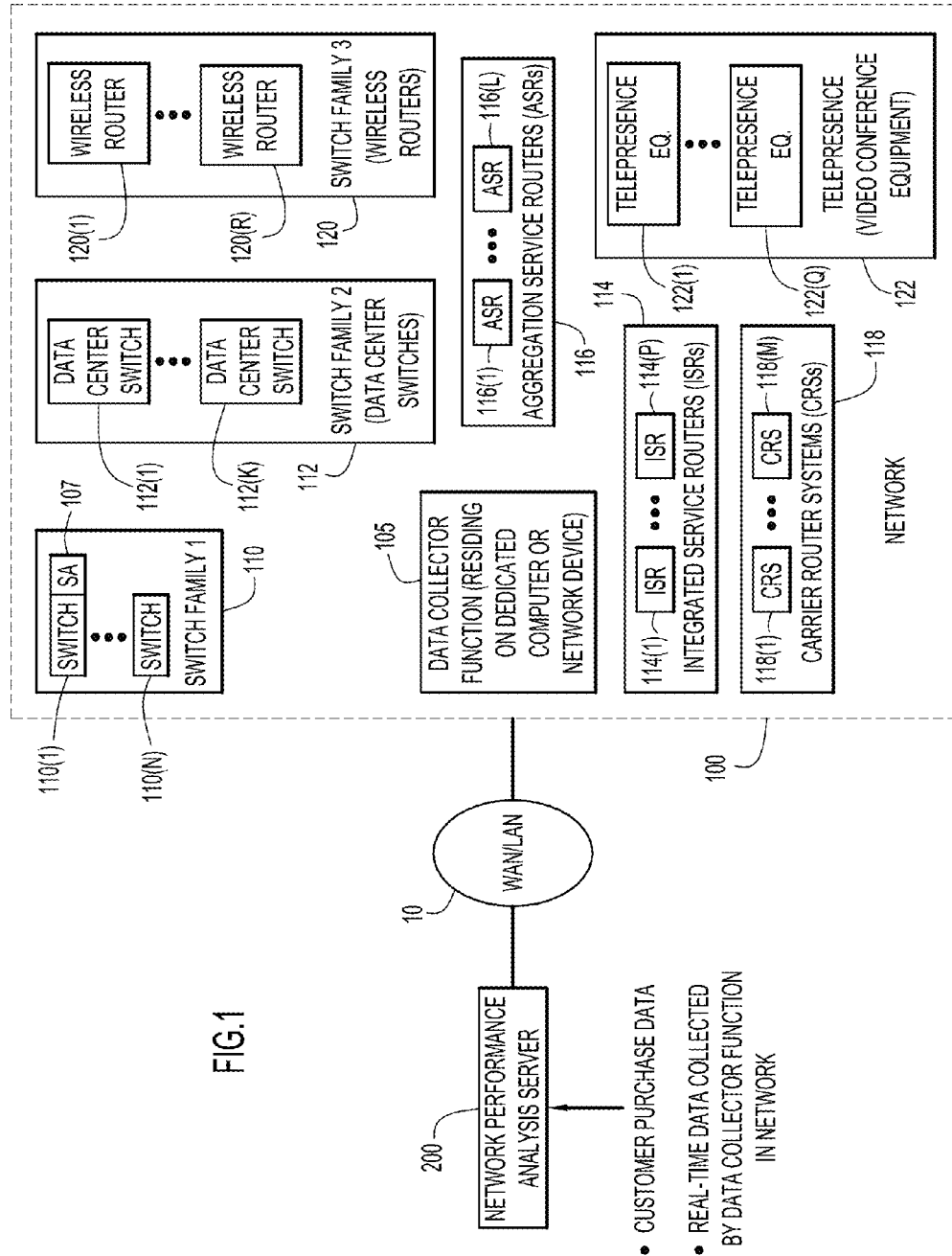
FIG. 1 is a block diagram illustrating a network comprising a plurality of network devices and a mechanism to determine a size or normalization factor for normalizing a network performance index of the network.

Referring first to FIG. 1, a network 100 is shown comprising a plurality of network devices/equipment. The network 100 may be used by a service provider for providing a variety of networking, telecommunication, data center, virtualization, video conferencing, and other functions/services, or by an enterprise or other entity. The network 100 includes numerous devices that work together to provide the services. According to the techniques described herein, the number and types of devices in the network 100 are continuously tracked to generate normalized performance metrics or indexes. To this end, a network performance analysis server 200 is coupled to the network 100 by way of a wide area network (WAN) or local area network (LAN), collectively referred to at reference numeral 10. Data about the devices in the network 100 may be obtained from a data collector function 105 that resides on a dedicated computing device or on a network device in the network 100.

The size and complexity of the network 100 is reflected by the number and types of devices in the network 100. When a performance index for the network 100 is generated by the network performance analysis server 200, it is adjusted (i.e., normalized) to account for the size (number of devices) in the network. To more accurately determine how to adjust a performance index, devices in the network are grouped into groups (referred to as Families herein) of similar functions/types. For example, there are numerous switches but not all the switches perform the same functions and are the same. Likewise, there are numerous routers, but not all of the routers are the same and perform the same functions. Moreover, the lifetimes or longevity of certain groups of devices are different. These factors are taken into account in the course of generating an adjusted or normalized network performance index.

Examples of devices in the network 100 are as follows. In the following examples, product names/models of Cisco Systems, Inc. are used. It is to be understood that this is only an example, and the network devices could be from any one or several manufacturers or vendors. There is a plurality of switches 110(1)-110(N), such as Cisco Catalyst™ 6500 Series switches, e.g., one or more switches of models Catalyst 6513, Catalyst 6513-E, Catalyst 6509-E, Catalyst 6506-E, Catalyst 6504-E and Catalyst 6503-E. The switches 110(1)-

110(N) are grouped or categorized into a common group or family 110. In addition, there are data center switches 112(1)-112(K) that are grouped into a common group or family 112. Examples of data center switches 112(1)-112(K) are Cisco Nexus 7000 Data Center Switches, including the Nexus 7000 18-Slot switch, Nexus 7000 10-Slot switch and Nexus 7000 9-Slot switch.

There are integrated service routers (ISRs) 114(1)-114(P) that are used for branch-office network routing services. The ISRs 114(1)-114(P) are grouped into a group or family 114. Examples of ISRs are Cisco 3900 ISRs, e.g., ISR 3945, ISR 3945E, ISR 3925 and ISR 3925E.

There are aggregation service routers (ASRs) 116(1)-116(L) that are grouped into group or family 116. Examples of ASRs are Cisco 9000 ASRs, such as ASR 9922, ASR 9010, ASR 9006 and ASR 9001. There are carrier router systems (CRSs) 118(1)-118(M) that are grouped into group or family 118. Examples of CRSs are Cisco CRS-1 16-Slot Single-Shelf System, CRS-1 8-Slot Single-Shelf System, CRS-1 4-Slot Single-Shelf System and CRS-1 Multishelf System.

There are wireless routers, e.g., IEEE 802.11 wireless routers, 120(1)-120(R), that are grouped into a family or group 120. Wireless routers 120(1)-120(N) provide wireless local area network connectivity in the network 100. Examples of wireless routers are Cisco Aironet 600, Aironet 1040, Aironet 1260 and Aironet 1149.

The network 100 may also include video conferencing equipment, referred to as Telepresence equipment (Eq.), shown at reference numerals 122(1)-122(Q). Examples of Telepresence equipment included Cisco TelePresence 3000, TelePresence 3100, TelePresence 3200 and TelePresence 3210. The Telepresence equipment includes video conference switches and endpoints to serve high quality audio and video for a video conference session across the WAN/LAN 10. The Telepresence equipment is grouped into group or family 122.

The number of devices in the network 100 at any given time may vary as old equipment is taken out and new equipment is added. In addition, new equipment may be added to serve new features and functions of the network 100. Thus, the performance indexes that are obtained to measure the performance of the network 100 are greatly dependent on the amount and type of equipment in the network 100 at any given time.

According to the techniques described herein, the network performance analysis server 200 is configured to adjust or normalize performance indexes based on the amount and type of equipment in the network 100. The network performance analysis server 200 can obtain information about the amount and type of devices in the network 100 from customer purchase data pertaining to purchases of network equipment by the customer that operates network 100. In addition, or in the alternative, the network performance analysis server 200 may obtain real-time data collected from a data collector function 105 in the network 100. For example, many network equipment manufacturers include a software option that allows a customer to elect to report to the manufacturer, by way of message sent via the WAN/LAN 10, data indicating the installation of new network devices as well as data indicating the removal of network devices from service in the network. As a further example, each network device may include a software agent that, when the network device is activated in the network, a system message or report is automatically sent to a vendor's computing device (e.g., by an email, HTTP POST, or other similar operations) so as to automatically inform the network performance analysis server 200 about the addition of the network device to the network. An example of a software agent (SA) is shown at 107 in switch 110(1).

In order to determine how to adjust or normalize a performance index, the "size" of the network is computed. The network size is represented by a total number of device units in the network at a given time. A device unit may be defined as a portion of the network, for example, a portion of the network worth a predetermined economic value, e.g., ten thousand US dollars. A normalized network index is defined in terms of an index value per device unit, for example, network risk per device unit or network disruption per device unit.

Figure 2:
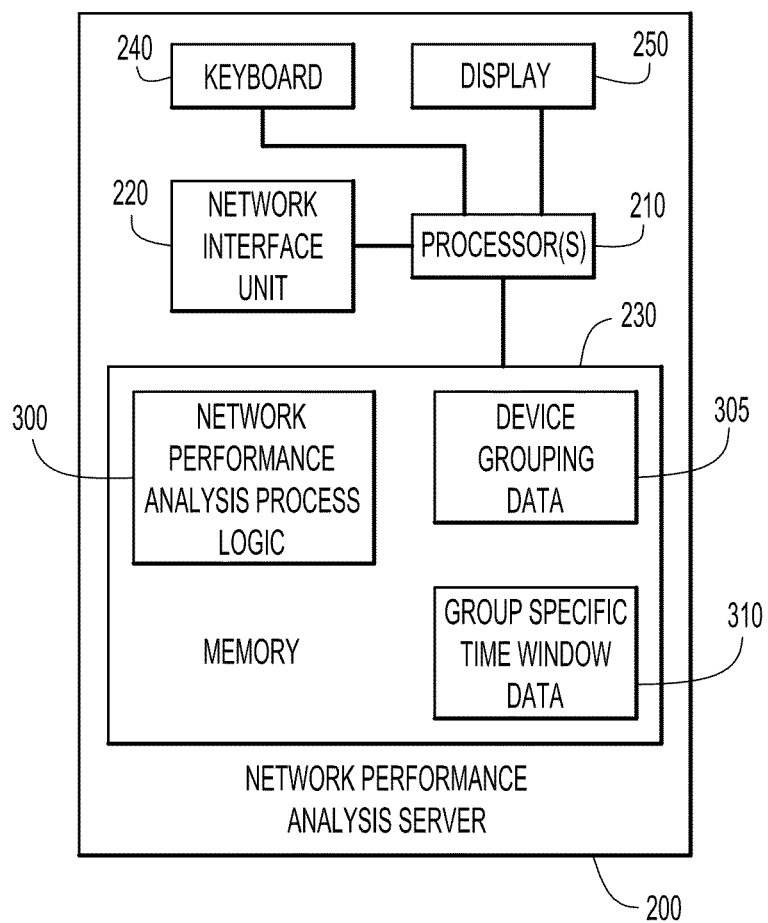
FIG. 2 is a block diagram of an example network performance analysis server that is configured to generate a normalized performance index for a network.

Turning now to FIG. 2, an example block diagram of the network performance analysis server 200 is described. The network performance analysis server 200 is a computing device that may take the form of a server computer. It may reside separate from the network 100, such as a facility owned or controlled by a network equipment manufacturer, or may reside within the network 100. The network performance analysis server 200 includes a processor 210 (e.g., a microprocessor or microcontroller), a network interface unit 220, a memory 230, a keyboard 240 and a display 250. The network interface unit 220 enables communications over a network, e.g., WAN/LAN 10 with the network 100 to be analyzed, and to enable network communications with other sources of information about the network 100. For example, the network interface unit 220 is an Ethernet card. The memory 230 stores instructions for network performance analysis process logic 300, device grouping data 305 that contains data for grouping network devices into groups or families, and group-specific time window data 310 that contains data for the durations of time windows representing the effective lifetime of different groups of network devices, as described further hereinafter. User input to the network performance analysis server 200 may be by way of keyboard 240 and a user may view output (e.g., numbers, plots, etc.) of the network performance analysis server 200 by the display 250.

The memory 230 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 230 may comprise one or more tangible computer readable storage media (e.g., a memory device) encoded with software comprising computer executable instructions and when the software is executed (by the processor 210) it is operable to perform the operations described herein in connection with the network performance analysis process logic 300.

Reference is now made to FIGS. 3-6 with continued reference to FIG. 1. In the example of FIGS. 3-6, all the network equipment is grouped into four families or groups: Family 1, Family 2, Family 3 and Family 4. A dynamic sliding time window is defined for the baseline network size in which the life cycle durations of network equipment families (groups) are maintained, and a cycling counter to calculate the total number of devices in each network equipment family or group. The life cycle duration (i.e., lifetime) of each network equipment family or group is based on statistical analysis of the performance lifetime of similar devices, statistical analysis of the service contracts, customer service accounts, and platform or hardware releases. The sliding time window moves in discrete time intervals (units of time), determined by the periodic cycle of network device installation and upgrades.

Figure 3:
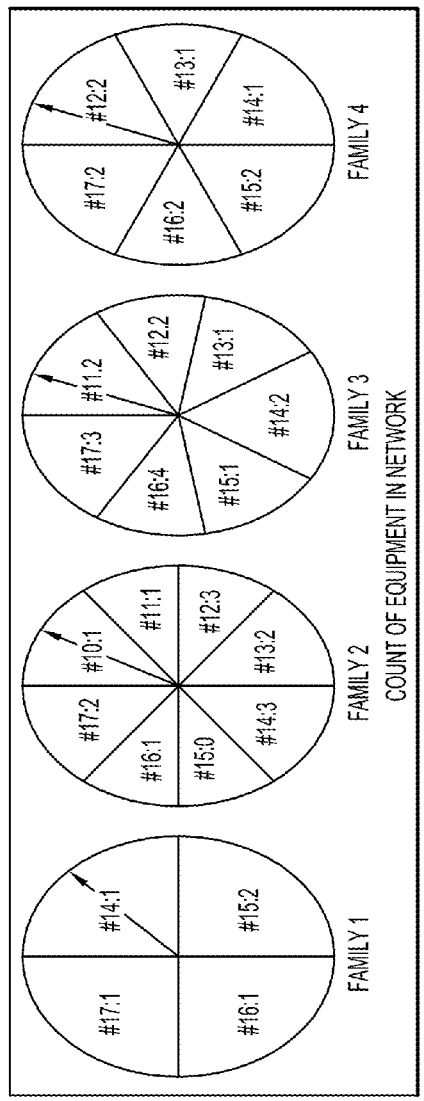
FIG. 3 is a diagram pictorially representing a plurality of counters configured to count devices for families or groups of network devices in a network at a particular time period.

The circles in FIG. 3 are divided into a number of sections equal to the life cycle duration for that family. For example, Family 1 has a life cycle duration of 4 units of time, and as such the circle for Family 1 is divided into 4 sections. Family 2 has a life cycle duration of 8 units of time and the circle for Family 2 is divided into 8 sections. Family 3 has a life cycle duration of 7 units of time, and Family 4 has a life cycle duration of 6 units of time. The units of time may be months, years, etc. The sliding time window for Family 1 is 4 time units, for Family 2 is 8 time units, for Family 3 is 7 time units and for Family 4 is 6 time units. In this example, Family 1 may correspond to lower end network switches that have a useful lifetime of 4 units of time (e.g., 4 years). Family 2, by contrast, may correspond to higher-end equipment, e.g., CRS's, that have a substantially long lifetime, e.g., 8 units of time (e.g., 8 years). These are only examples. The concept is that network devices are grouped into families based on device lifetime, and then the number of devices in the network at any given period of time is tracked for each family, but only during a sliding time window that is based on the lifetime of that family.

Figure 4:
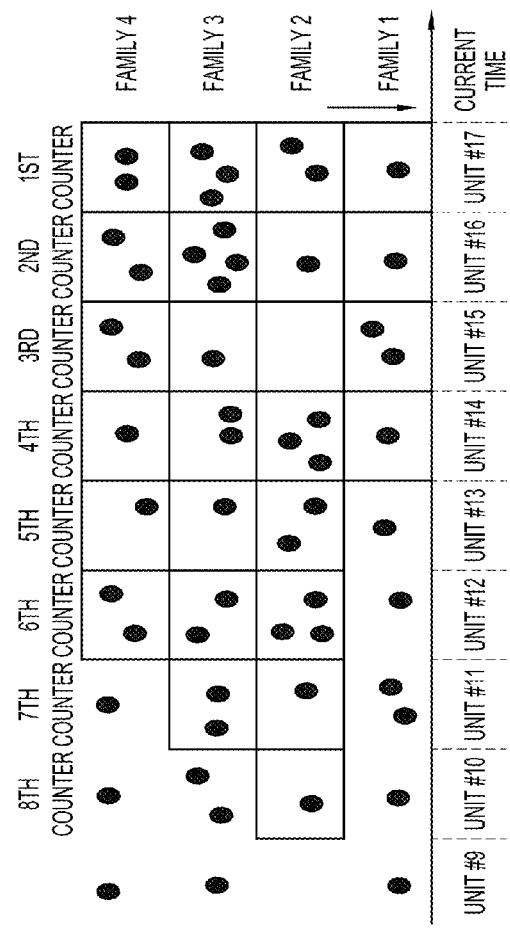
FIG. 4 is a timing diagram pictorially representing dynamic sliding time windows unique to each family or group of network devices for counting devices in the network over time.

FIG. 4 shows units of time along the horizontal axis, and within each block a dot that represents the number of network units in a given Family during that unit of time. In the example of FIG. 4, data is shown spanning time unit #9 to time unit #17, where time unit #17 is the most recent time unit for which a count was made up to the current time. Thus, during time unit #17 in a given network, there were two network devices in Family 4, 3 network devices in Family 3, 2 network devices in Family 1, and 1 network device in Family 1. During time unit #16, there were 2 network devices in Family 4, 4 network devices in Family 3, 1 network device in Family 2 and 1 network device in Family 1. From time unit #16 to time unit #17, one network device was removed in Family 3 and one network device was added in Family 2.

Thus, in the example of FIGS. 3-6, there are 25 counters, one for each of the units of time of the sliding time window for each Family. The time line is divided into discrete period or intervals, with each period being of unit time length as shown in FIG. 4. Each counter contains a count of the number of devices units during a period. At the initial period, all counters are set to 0. For example, the sliding time window for Family 1 is 4 time units (periods). Therefore, there are four counters allocated that count the number of network devices in respective time units, over a sliding time window. For Family 2 there are 8 counters, and so on. There is also one additional counter (an overall or total counter) to count up all of the network devices across all of the Families at any given unit of time (across the sliding time windows for the respective Families).

The first counter in the sliding window for a Family is incremented when a new device is installed for that Family. Once the end of the first period is reached, the next counter is incremented at each occurrence. Eventually, all counters will have been used. At the next time period, the first counter is reset to 0 and starts incrementing from 0 again. The process continues in this way after the end of each time period.

For each time interval within the sliding time window, a count is maintained. The sum of the counts of the intervals in the sliding window represents the number of devices for the most recent time interval. The counts for each network device Family are arranged in cyclical fashion so that when the sliding time window moves to the right, the next counter in clockwise direction is overwritten, representing the "oldest" interval that is no longer needed anymore as the sliding window has moved on. In this sense, the counts are maintained in what can be thought of as a cyclical queue, with the counter for the newest time period overwriting the oldest that can be removed from the queue. A data structure is created (and stored in memory 230 of the network performance analysis server 200) that contains a counter for each of the time units that make up the sliding time window. Each counter tracks a count of the number of devices present in the network for a corresponding unit of time within the time window specific to that group.

FIG. 3 illustrates a paradigm in which the counters of a sliding time window are arranged in a circle, with the pointer/arrow to the current counter moving clockwise like the hand of a clock. The total count is summed at the end of each time period. The text in each of the sections of the circles in FIG. 3 indicates the count of network devices at a time unit (for a corresponding one of the counters for a sliding time window). For example, in the upper right section of the circle for Family 1, the text "#17:2" means that in time unit #17, there are 2 network devices in Family 1. The total count of network devices within the sliding time windows for the respective Families is 43 in the example of FIG. 3. The network devices in time units #13 and older are not counted for Family 1 because they are outside the sliding time window (4 time units) for Family 1. Similarly, the network devices in time units #10 and older are not counted for Family 3 because they are outside the sliding time window (4 time units) for Family 3. The network devices in time units #11 and older are not counted for Family 4 because they are outside the sliding time window (6 time units) for Family 4.

Figure 5:
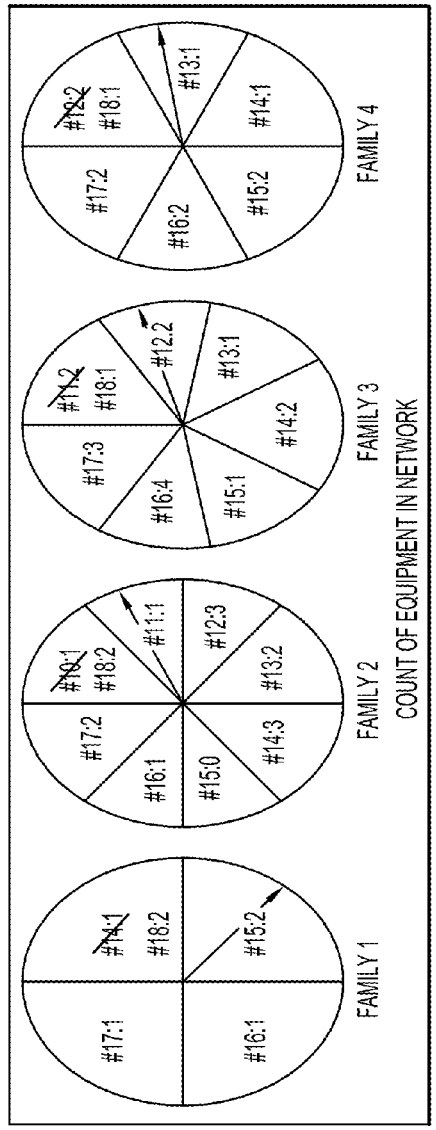
FIG. 5 is a diagram similar to FIG. 3 that represents the plurality of counters configured to count devices for families or groups of network devices at a time period subsequent to that shown in FIG. 3.
Figure 6:
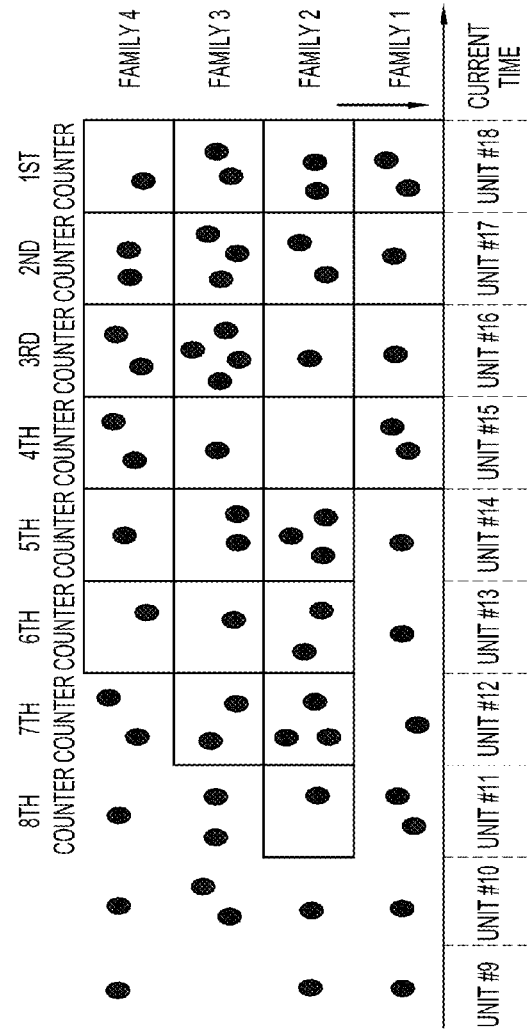
FIG. 6 is a timing diagram pictorially representing the sliding time windows unique to each family or group of network devices at the time period shown in FIG. 5.

FIGS. 5 and 6 illustrate a similar paradigm as that shown in FIGS. 3 and 4, but with data for the next time unit, unit #18. The counts for time unit #17 have been moved to the second counter for each of the Families, and the first counter for each of the families counts the number of devices in the most recent time unit, unit #18. The Family-specific sliding time window results in some of the network devices in previous time units (that are outside the Family-specific time window with respect to the current time) being discarded or ignored as explained above in connection with FIG. 4. The total number of network devices counted as of time unit #18 for the example shown in FIGS. 5 and 6 is 44. The change from time unit #17 to time unit #18 is such that the first counter for Family 1 counts two devices, the first counter for Family 2 counts two devices, and so on. Moreover, the sliding time windows for the Families result in the number of network devices for time units #14 and older being discarded for Family 1, the number of network devices for time units #10 and older being discarded for Family 2, the number of network devices for time units #11 and older being discarded for Family 3, and the number of network devices for time units #12 and older being discarded for Family 4.

Figure 7:
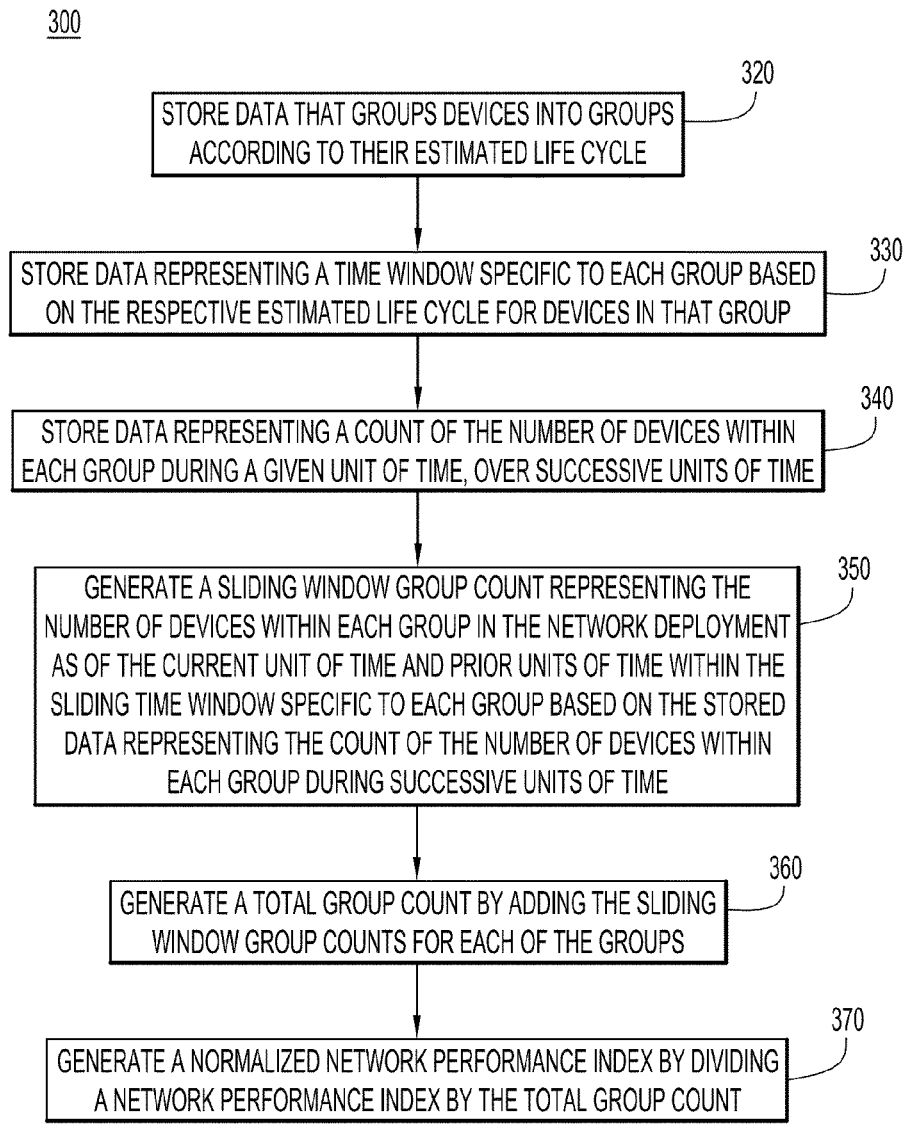
FIG. 7 is a flow chart generally depicting operations to generate a normalized network performance index based on family-specific sliding time windows as depicted in FIGS. 3-6.

Reference is now made to FIG. 7 for a description of a flow chart that summarizes the operations of the network performance analysis process logic 300 in adjusting a network performance index according to the concepts depicted in FIGS. 3-6. At 320, data is stored that groups network devices into groups (Families) based on their estimated life cycle duration, which is determined from statistical analysis of service contracts, customer service accounts, etc., of various network devices deployed in a network, and mean to represent the useful lifetime of similar network devices. The data stored at operation 320 corresponds to the device grouping data 305 referred to in FIG. 2. The Families of network devices for a given network may be different from one network deployment to another. At 330, data is stored that represents a time window specific to each group (Family) based on the respective estimated life cycle for devices in that group. The data stored at operation 330 corresponds to the group specific time window data 310 shown in FIG. 2. The group specific time window data indicates the sliding time window length (in time units) for each Family, and also in turn indicates the number of counters that need to be allocated for each Family. The number of counters for a Family is equal to the number of time units for a particular sliding time window. For example, a sliding time window of length 5 time units for one Family is allocated 5 counters, a sliding time window of length 7 time units for another Family is allocated 7 counters, etc. Operations 320 and 330 are performed "off-line" before actual counting begins for a network deployment.

At operation 340, counting begins for network devices in a network deployment. As explained above, data about the number and types of network devices installed and removed from a network can be gathered from customer purchase history data, from data reporting capabilities embedded in the network devices themselves, and/or from manual entry by a person into the network performance analysis server 200, etc.

At 340, data is stored that represents a count of the number of devices within each group (Family) during a given unit of time, over each of a plurality of successive units of time. Thus, operation 340 is repeated for each successive time unit, e.g., month, several months, year, etc.

At 350, a sliding window group count is generated that represents the number of devices within each group (Family) in the network as of the current unit of time and prior/previous units of time within the sliding time window specific to each group (Family). The sliding window group count is generated based on the stored data obtained at operation 340 for the count of the number of devices within each group (Family) during successive units of time (but within the sliding time window for that group (Family). In terms of the plurality of counters in the aforementioned data structure, the sliding window group count involves adding values of the counters for the plurality of time units of the Family-specific time window.

At 360, a total group (Family) count is generated by adding the sliding window group counts for each of the groups (Families). This total group count is the total number of network devices in the network within the sliding time windows of the respective groups as of the current unit of time. The total group count is the aforementioned normalization or size factor.

Operation 370 involves adjusting or normalizing a network performance index. There are numerous techniques for obtaining and/or computing network performance indexes of various types, and they are not described herein because the normalization techniques described herein may be used for any network performance index. Regardless of the type of network index or the way in which it is computed, operation 370 generates an adjusted or normalized network index by dividing the network performance index by the total group count (obtained at operation 360). In the example of FIGS. 3 and 4, the total group count is 43. In the example of FIGS. 5 and 6, the total group count is 44.

The operations of storing data representing a count of devices in the network within each group or family (operation 340) during a given unit of time over successive units of time, generating the sliding window group count, generating the total group count and generating the normalized network performance index are repeated over a desired plurality of units of time. The data representing the numbers of types of devices in the network is obtained from received data indicates additions to and removal of devices from the network over time. For example, the data may be obtained from reports or messages received (over a WAN or LAN) from devices that are added to or removed from the network, or from purchase data of devices added to the network to replace or supplement existing devices in the network.

Figure 8:
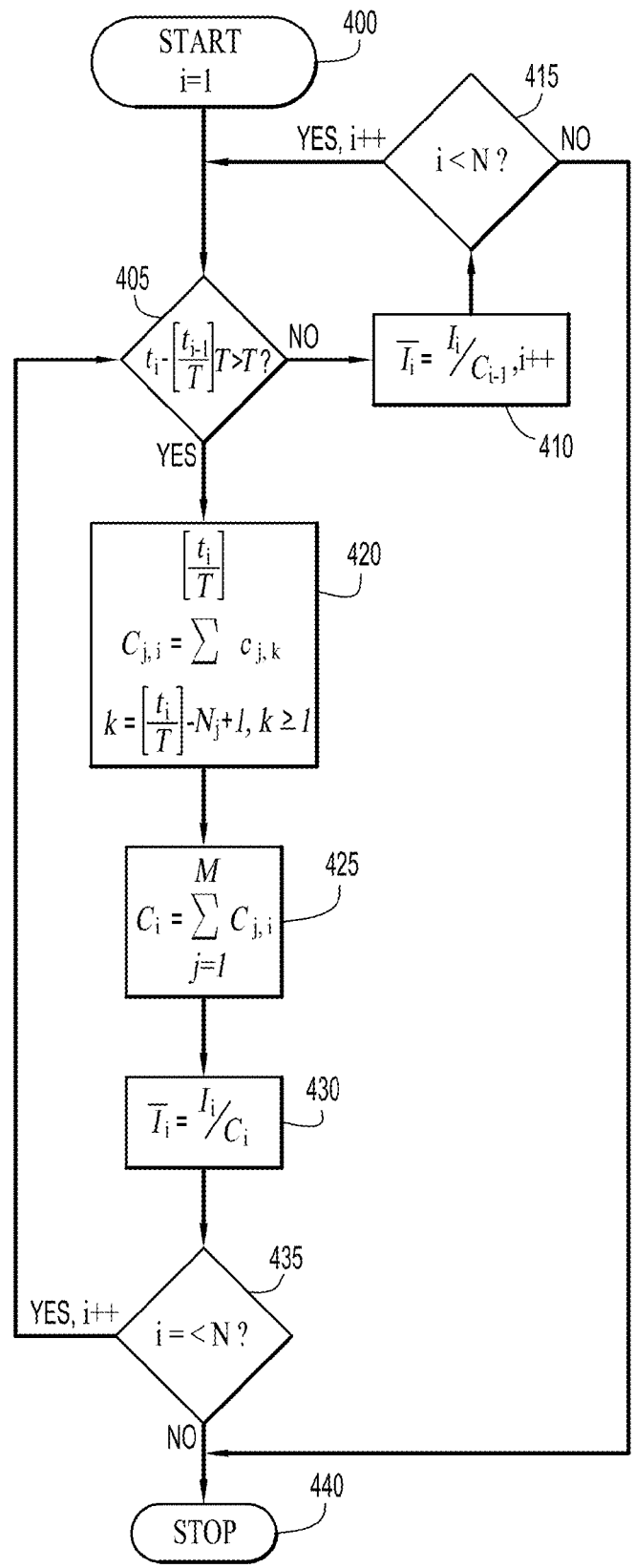
FIG. 8 is a flow chart that in more detail illustrates computations to generate a normalized network performance index.

Reference is now made to FIG. 8 for a more detailed description of the computations made to generate the normalization factor (total group count) described above in connection with FIGS. 3-7. The following quantities are defined that are used in the flow chart of FIG. 8.

i is a time unit index.

$t_i$ is a time stamp at time unit i.

j is a network device/product group (Family) index.

k is a counter index corresponding to a counter associated with a time unit with the sliding time window.

T is the life cycle duration (e.g., lifetime) for a group or Family.

$C_{j,i}$ is a count of network devices for Family j at time stamp $t_i$.

$c_{j,k}$ is a value of a counter k that counts network devices at a time unit or period within the sliding time window specific to Family j. k will have a maximum value that is dependent on the length of the sliding time window for a particular Family j. Examples of the counters are shown in FIGS. 3-6. For example, if Family 1 has a sliding time window of 4 (4 time units), then k=4 for j=1.

$C_i$ is a count of network devices at time stamp $t_i$ across all of the Families, i.e., the total count referred to above.

$I_i$ is the un-normalized performance index at time stamp $t_i$.

$\bar{I}_i$ is the normalized performance index at time stamp $t_i$.

N is the number of time units over which the normalization factor is to be computed.

M is the number of Families.

At 400, the process starts whereby the index i is set to 1. At 405, a comparison is made per the equation shown in FIG. 8 to determine whether sufficient time has elapsed to reach the next time unit. If not, at 410 the normalized performance index $\bar{I}_i$ is computed based on the total count $C_i$ as of the previous time stamp (i−1). At 414, it is determined whether the current value of the index i is less than N. If not, then the process ends, otherwise, index i is incremented (i++) and the process goes back to 405. Eventually, when sufficient time has passed, the answer to operation 405 will be affirmative, and the flow proceeds to operation 420.

At 420, $C_{j,i}$ is computed across values of $c_{j,k}$. At 425, $C_i$ is computed across all of the (M) Families. At 430, the normalized performance index $\bar{I}_i$ is computed by dividing the un-normalized or raw performance index $I_i$ at time stamp i by the total count value $C_i$. At 435, the index is compared with N, and if i is greater than N, the process ends at 440.

Figure 9:
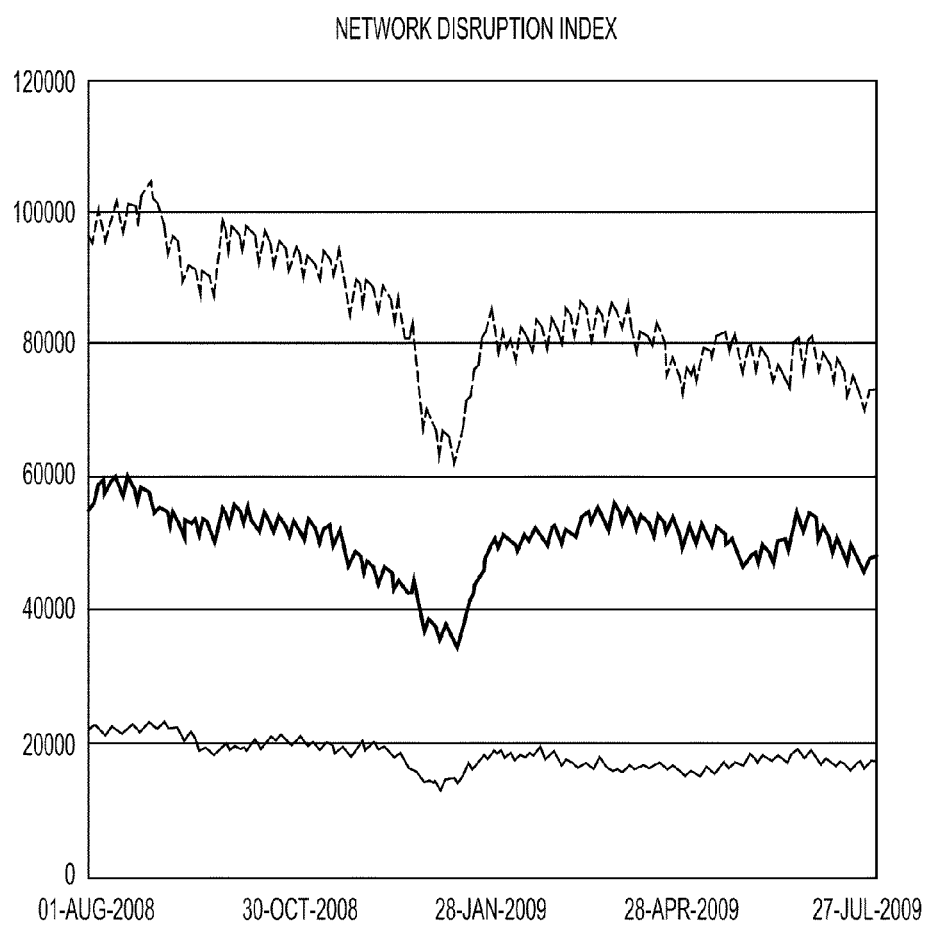
FIG. 9 is a diagram showing examples of plots of un-normalized network disruption indexes for different service provider networks.
Figure 10:
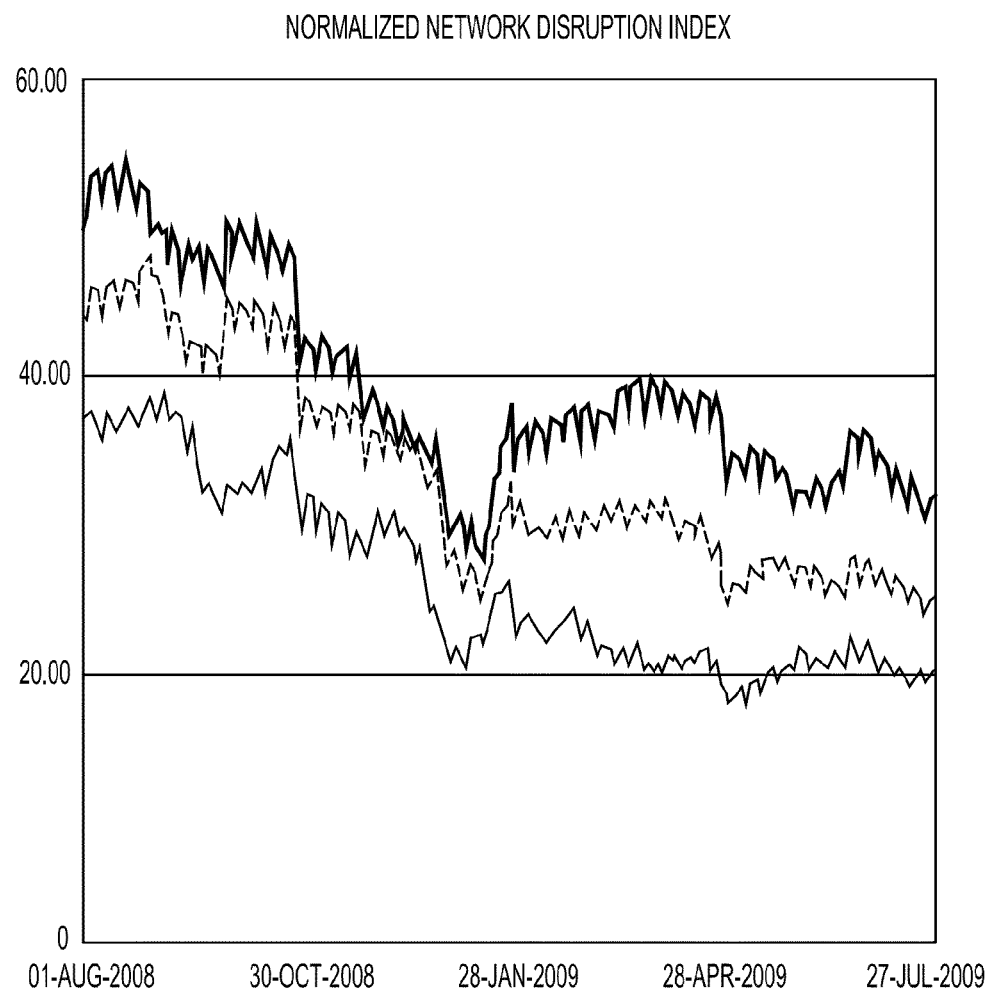
FIG. 10 is a diagram showing examples of plots normalized network disruption indexes for the plots shown in FIG. 9.
Figure 11:
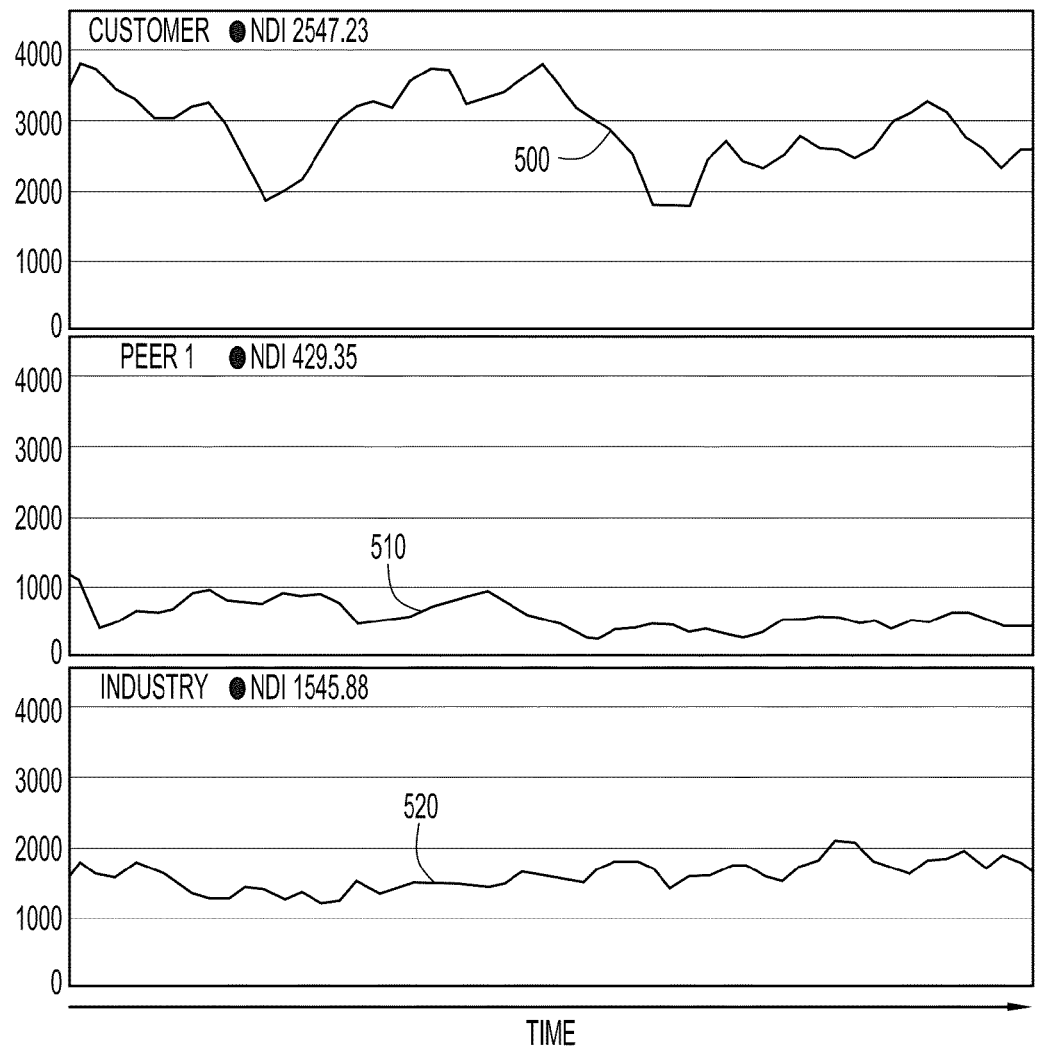
FIG. 11 is a diagram showing examples of plots of normalized network disruption indexes for a customer network, a peer network and an industry benchmark.

Reference is now made to FIGS. 9-11 to illustrate the advantages of a normalized network performance index. FIG. 9 shows plots of an un-normalized Network Disruption Index (NDI) for several service provider networks. Each trace represents the NDI for a different service provider network. FIG. 9 shows that some networks have many more network disruptions than others, but these plots do not take into account the size and complexity of the network.

FIG. 10 shows plots of a normalized NDI for the same service provider networks shown in FIG. 9. As shown in FIG. 10, once each NDI is normalized to take into account the size and complexity of the respective networks (using the techniques described herein), the plots for the service provider networks are much closer to each other. This reveals that when size and complexity of the network is taken into account, the NDI's of these particular networks are not that different from each other. This is very useful information to network service providers.

FIG. 11 illustrates examples of plots of normalized NDI generated according to the techniques described herein. The plot of normalized NDI for a given customer network is shown at 500. The plot of normalized NDI at 510 is for a network that would be considered a peer to the network whose NDI is shown at 500. At 520, a plot is shown for normalized NDI that is deemed to be industry standard or a benchmark based on data obtained from numerous service provider networks. By normalizing a given performance index, such as NDI, it allows for a more meaningful comparison with other networks and an industry standard. For example, in FIG. 11, the NDI plot 500 indicates that it is substantially higher and more volatile than that of a peer network and even the industry standard.

In summary, techniques are provided for normalization of a network performance index. A dynamic sliding time window (for each group or family of devices) with multiple lengths is used to count network devices/units in the network. The sliding time window is divided into a number of fractional time intervals. A counter is created for each time interval in the sliding time window. The counters may be arranged in a cyclical data structure, resulting in the most distant counter to be overwritten over time. The total count of devices/units, i.e., the size of the network, is represented by a sum of the counters (across all groups of devices). The normalized network performance index is calculated by dividing the network performance index by a size or "normalization" factor obtained from the sum of the counters across all groups or families of devices.

The techniques described herein normalize any network performance indexes which are dependent on the sizes of networks, such as, the network security index, network disruption index, number of service requests, number of network outages, number of best practice violations, and number of network Syslog messages. By normalizing certain network performance indexes it is possible to use the use the index for industry benchmarking, peer comparison, and industry comparison.

The above description is intended by way of example only.

What is claimed is:

1. A method comprising:
storing data that groups devices in a network into groups according to their estimated life cycles;
storing data representing a time window specific to each group based on the respective estimated life cycle for devices in that group;
storing data representing a count of the number of devices in the network within each group during a given unit of time, over successive units of time;
generating a sliding window group count representing the number of devices within each group in the network as of a current unit of time and prior units of time within the time window specific to each group based on the stored data representing the count of the number devices within each group during successive units of time;
generating a total group count by adding the sliding window group counts for each of the groups; and
generating a normalized network performance index by dividing a network performance index by the total group count.

2. The method of claim 1, wherein generating the sliding window group count comprises ignoring devices that are outside, with respect to the current time, the time window specific to that group.

3. The method of claim 1, wherein storing data representing a count, generating the sliding window group count, generating the total group count and generating the normalized network performance index are repeated over a plurality of units of time.

4. The method of claim 1, wherein storing data that groups devices comprises storing data that groups devices into respective groups based on one or more of: statistical analysis of the performance lifetime of similar devices and statistical analysis of service contracts devices.

5. The method of claim 1, and further comprising receiving data that indicates addition to and removal of devices from the network over time.

6. The method of claim 5, wherein receiving data comprises receiving reports from devices added to and removed from the network.

7. The method of claim 5, wherein receiving data comprises receiving purchase data of devices added to the network to replace or supplement existing devices in the network.

8. The method of claim 1, and further comprising storing data for a data structure that contains a counter for each of a plurality of time units of the time window specific to each group, wherein each counter tracks a count of the number devices present in the network for a corresponding unit of time within the time window specific to that group, and wherein generating the sliding window group count comprises adding values of the counters for the plurality of time units of the time window specific to each group.

9. A computer readable storage device encoded with software comprising computer executable instructions and when the software is executed operable to:
storing data that groups devices in a network into groups according to their estimated life cycles;
store data representing a time window specific to each group based on the respective estimated life cycle for devices in that group;
store data representing a count of the number of devices in the network within each group during a given unit of time, over successive units of time;
generate a sliding window group count representing the number of devices within each group in the network as of a current unit of time and prior units of time within the time window specific to each group based on the stored data representing the count of the number devices within each group during successive units of time;
generate a total group count by adding the sliding window group counts for each of the groups; and
generate a normalized network performance index by dividing a network performance index by the total group count.

10. The computer readable storage device of claim 9, wherein the instructions operable to store data representing a count, generate the sliding window group count, generate the total group count and generate the normalized network performance index are repeated over a plurality of units of time.

11. The computer readable storage device of claim 9, wherein the instructions operable to generate the sliding window group count comprises instructions to ignore devices that are outside, with the respect to the current time, the time window specific to that group.

12. The computer readable storage device of claim 9, wherein the instructions operable to store data that groups devices comprises instructions operable to store data that groups devices into respective groups based on one or more of: statistical analysis of the performance lifetime of similar devices and statistical analysis of service contracts devices.

13. The computer readable storage device of claim 9, and further comprising instructions to store data for a data structure that contains a counter for each of a plurality of time units of the time window specific to each group, wherein each counter tracks a count of the number devices present in the network for a corresponding unit of time within the time window specific to that group, and wherein the instructions operable to generate the sliding window group count comprise instructions operable to add values of the counters for the plurality of time units of the time window specific to each group.

14. An apparatus comprising:
a network interface unit configured to enable network communications;
a memory configured to store data that groups devices in a network into groups according to their estimated life cycles, data representing a time window specific to each group based on the respective estimated life cycle for devices in that group, and data representing a count of the number of devices in the network within each group during a given unit of time, over successive units of time;
a processor coupled to the memory and network interface unit, wherein the processor is operable to:
generate a sliding window group count representing the number of devices within each group in the network as of a current unit of time and prior units of time within the time window specific to each group based on the stored data representing the count of the number devices within each group during successive units of time;
generate a total group count by adding the sliding window group counts for each of the groups; and
generate a normalized network performance index by dividing a network performance index by the total group count.

15. The apparatus of claim 14, wherein the processor is configured to generate the sliding window group count comprise instructions operable to ignore devices that are outside, with respect to the current time, the time window specific to that group.

16. The apparatus of claim 14, wherein the processor is configured to store data representing a count, generate the sliding window group count, generate the total group count and generate the normalized network performance index repeatedly over a plurality of units of time.

17. The apparatus of claim 14, wherein the processor is configured to store data that groups devices comprises instructions operable to store data that groups devices into respective groups based on one or more of: statistical analysis of the performance lifetime of similar devices and statistical analysis of service contracts devices.

18. The apparatus of claim 14, wherein the processor is further configured to store in the memory data for a data structure that contains a counter for each of a plurality of time units of the time window specific to each group, wherein each counter tracks a count of the number devices present in the network for a corresponding unit of time within the time window specific to that group, and wherein the processor is configured to generate the sliding window group count by adding values of the counters for the plurality of time units of the time window specific to each group.

19. The apparatus of claim 14, wherein the processor is configured to receive data that indicates addition to and removal of devices from the network over time.

20. The apparatus of claim 19, wherein the processor is configured to receive reports from devices added to and removed from the network.

* * * * *